(12) United States Patent
Bielawski et al.

(10) Patent No.: US 8,263,257 B2
(45) Date of Patent: Sep. 11, 2012

(54) REMOVABLE HANDLE FOR INDUSTRIAL BATTERY

(75) Inventors: Matthew Bielawski, Milwaukee, WI (US); Mark Inkmann, Wauwatosa, WI (US); Guy Pfeifer, Milwaukee, WI (US); David Thuerk, Brookfield, WI (US)

(73) Assignee: C&D Technologies, Inc., Blue Bell, PA (US)

( * ) Notice: Subject to any disclaimer, the term of this patent is extended or adjusted under 35 U.S.C. 154(b) by 1135 days.

(21) Appl. No.: 12/156,574

(22) Filed: Jun. 3, 2008

(65) Prior Publication Data

US 2009/0297933 A1    Dec. 3, 2009

(51) Int. Cl.
  *H01M 2/10* (2006.01)
(52) U.S. Cl. .................................................. 429/187
(58) Field of Classification Search .................... 429/187
  See application file for complete search history.

(56) References Cited

U.S. PATENT DOCUMENTS

| 971,876 | A | 10/1910 | Apple |
| 1,778,772 | A | 10/1930 | Reid |
| 3,797,876 | A | 3/1974 | Gummelt |
| 3,956,022 | A | 5/1976 | Fox |
| 4,013,819 | A | 3/1977 | Grabb |
| D266,757 | S | 11/1982 | Campbell et al. |
| 4,374,188 | A | 2/1983 | Campbell et al. |
| 5,037,711 | A | 8/1991 | Bonnaud et al. |
| 5,242,769 | A | 9/1993 | Cole et al. |
| 5,283,137 | A | 2/1994 | Ching |
| 5,372,899 | A | 12/1994 | Kuipers et al. |
| 5,415,956 | A | 5/1995 | Ching |
| 5,440,785 | A * | 8/1995 | McDonald ...................... 16/423 |
| 5,670,274 | A | 9/1997 | Forrer |
| 5,814,422 | A | 9/1998 | Vezina |
| 6,177,211 | B1 | 1/2001 | Lawrence |
| 6,428,927 | B1 * | 8/2002 | Kump et al. .................. 429/187 |
| 6,942,945 | B2 | 9/2005 | Andersen et al. |

FOREIGN PATENT DOCUMENTS

WO    WO 2005/119815    12/2005

\* cited by examiner

*Primary Examiner* — Patrick Ryan
*Assistant Examiner* — Wyatt McConnell
(74) *Attorney, Agent, or Firm* — Hoffman & Baron, LLP

(57) ABSTRACT

A battery with a pair of handle assemblies that includes a battery casing having a pair of lips extending outwardly from the end walls near the opening in the battery casing. Each lip has a recessed portion with a slot defined by the end wall and a slot side wall. The battery casing also has a pair of protrusions on each of the end walls located below the slot. Each of the handle assemblies has a handle and an attachment structure that includes a substantially flat, rectangular base and a side wall. The back of the side wall has a cavity and a channel extending from an open end at the top edge to a closed end proximate the cavity. The handle includes a strap connected to the side wall on a first end and a loop on the second end. The handles are adapted to pass through the slots on the end walls of the battery casing, the channels are adapted to slidably contact the protrusions on the end walls, the cavities are adapted to detachably engage the protrusions and the bases are adapted to contact the slot side walls.

16 Claims, 8 Drawing Sheets

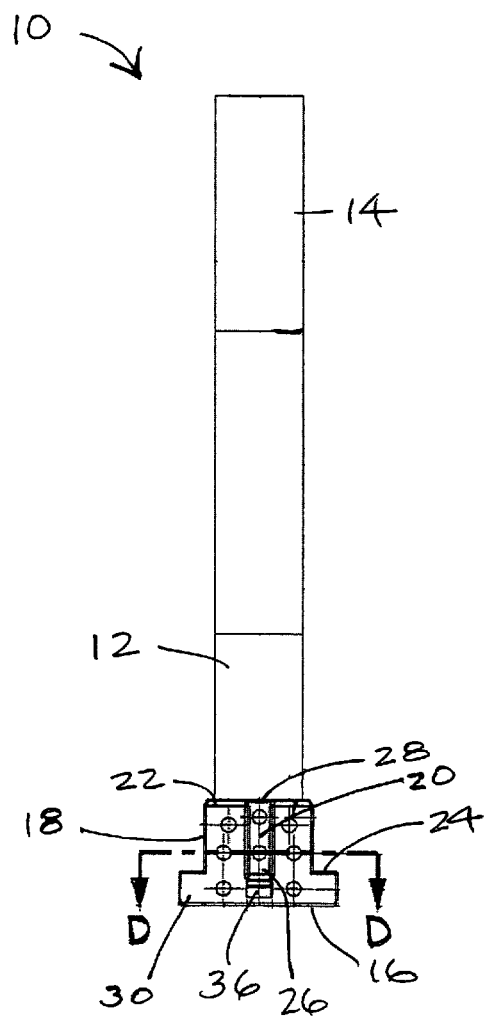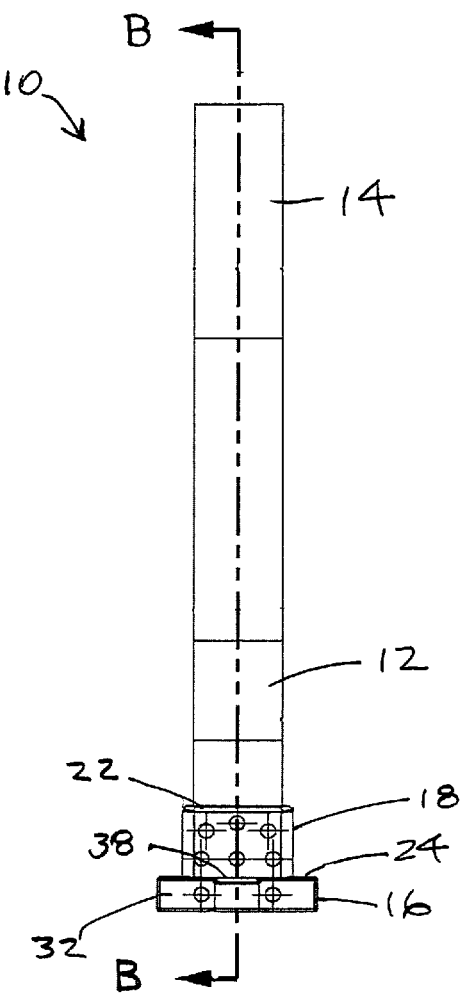
FIG. 10                    FIG. 11

REMOVABLE HANDLE FOR INDUSTRIAL BATTERY

FIELD OF THE INVENTION

The present invention is a handle assembly for a battery such as an industrial or automobile battery. In particular, the present invention relates to detachable handle assembly for a battery.

BACKGROUND OF INVENTION

Lead-acid batteries are the oldest type of rechargeable battery. The batteries are generally rectangular in shape and house pairs of cells containing lead plates and liquid electrolyte. Arrays of lead-acid cells are widely used as standby power sources for telecommunications facilities, generating stations, and computer data centers.

Lead-acid battery cases are typically made from a molded plastic material and often sealed. Dropping a lead-acid battery can rupture the case and damage the battery so that it is no longer usable. In addition, acid leaking from a ruptured battery case can be dangerous to personnel. Thus, batteries must be handled with care and, because of their weight, they can be difficult to install in equipment racks and vehicles, especially when there is limited space. To overcome this problem, various attempts have been made to provide handles for batteries. One type of handle is a strap that is pivotably attached to the opposing ends of the battery and, after the batter is installed, the handle is rotated to the side. However, the handle remains attached to the battery and can obstruct access to the battery and adjacent equipment.

Industrial batteries are typically mounted in racks or cabinets that are constructed for standard size batteries. Any replacement battery has to have the same "footprint" as a standard size battery in order to be an acceptable replacement. If the footprint of the battery is increased to accommodate a handle assembly, the footprint of the battery will be too big to fit in standard racks and enclosures. If the footprint of the battery is reduced to allow room for a handle assembly on the exterior of the battery casing, the battery cells will be smaller and have less power. Therefore, one of the constraints for designing a handle assembly for a battery is that the handle assembly cannot change the size of the footprint.

The attachment of a handle assembly to a battery is further complicated when the terminals for the battery are located on the end walls. One of the advantages of end wall mounted terminals is easier access to the connections for batteries mounted in racks or cabinets. However, the end mounted terminals limit the amount of space available on the end of the battery for connecting a handle assembly. In addition, the battery has a cover, which extends beyond the sides of the battery casing, and a user must be able to attach and detach the handle assembly with the cover installed on the battery. Therefore, the handle assembly must require a limited amount of space on the end of the battery and must not interfere with the connections to the terminals or the overlap of the cover to the casing.

Accordingly, there is a need for a battery handle that can be used to install the battery and then be detached once the battery is in position. There is also a need for a detachable battery handle that can lower a battery into a confined space without requiring additional clearance around the outside of the battery. Moreover, there is a need for a handle assembly that can be used with a standard size battery, which does not change the footprint of the battery or interfere with the terminals or cover. There is also a need for an easily molded low cost container and handle. These needs are satisfied by the handle assembly of the present invention, which has a slot and cavity in the handle that engages a protrusion located between the terminals on the battery casing.

SUMMARY OF THE INVENTION

In accordance with the present invention, a battery with a pair of handle assemblies is provided. The battery has a battery casing having a substantially rectangular bottom wall with a pair of side walls and a pair of end walls extending therefrom to form an opening. The battery casing includes a pair of lips extending outwardly from the pair of end walls near the opening in the battery casing. Each lip has a centrally located slot defined by the end wall and a slot side wall. The battery casing also has a pair of protrusions on each of the end walls located below the slot.

Each of the slots in the lips has a top that corresponds to the opening in the battery casing and a bottom that corresponds to the bottom wall, and each of the handle assemblies passes from the bottom through the top of the slots. Preferably, the top of each of the slots is located in a recessed portion of the lip. The battery casing also includes a cover that fits over the opening and extends over the slots in the lip. The recessed portions of the lips provide clearance between the tops of the slots and the cover for attaching and detaching the handle assemblies. One of the end walls can have a pair of battery terminals for connecting the battery and the slot on that end wall can be located between the pair of terminals.

Each of the handle assemblies includes an attachment structure having a substantially flat, rectangular base and a side wall having a front and back and extending from a side of the base to form a top edge. The back of the side wall has a cavity and a channel extending from an open end at the top edge to a closed end proximate the cavity. A handle is connected to the side wall of the attachment structure. The handle includes a strap connected to the side wall on a first end and a loop on the second end. Preferably, the side wall of the attachment structure is molded around the strap and the loop is foldable. In addition, each of the bases of the attachment structures has a notch for detaching the base from the slot. The handles are adapted to pass through the slots on the end walls of the battery casing, the channels are adapted to slidably contact the protrusions on the end walls, the cavities are adapted to detachably engage the protrusions and the bases are adapted to contact the slot side walls.

BRIEF DESCRIPTION OF THE FIGURES

The preferred embodiments of the detachable battery handle assembly of the present invention, as well as other objects, features and advantages of this invention, will be apparent from the accompanying drawings wherein:

FIG. 10 is a rear view of an embodiment of the handle assembly of the present invention.

FIG. 11 is a front view of the handle assembly shown in FIG. 10.

DETAILED DESCRIPTION OF THE INVENTION

The present invention is a handle assembly for a battery that is used in pairs and detachably connects to the opposing ends of the battery. The two handle assemblies are attached to the opposing ends so that a user can move the battery and, after the battery is installed, the handle assemblies can be easily detached. Each handle assembly has an attachment structure connected to a loop-type handle (also referred to herein as the handle or handle loop) by a strap. The attachment structure is formed by a base and a side wall that extends upwardly and connects to one end of the strap. The other end of the strap is connected to the handle. The side wall of the attachment structure has a channel extending from an opening at the top edge to a closed end. Next to the closed end of the channel is a cavity located at or near the base. The channel is adapted to slidably contact a protrusion extending from the exterior of the battery casing near the top of one of the end walls.

The handle assembly is attached to the battery by folding the handle loop substantially flat and inserting it from below through a slot extending outwardly from the end wall of the battery. The slot is located in a lip extending from the end wall and is defined by a side wall on the side opposite the end wall. The handle loop and strap pass through the slot and the protrusion on the end wall is slidably received by the channel on the side wall of the attachment structure. The handle loop and strap move upwardly until the closed end of the channel contacts the protrusion. The user then pulls up on the handle and the protrusion snaps into the cavity as the top surface of the base contacts the side wall of the slot. Preferably, a user lifts a battery by inserting his hands through the handle loops. This provides a firm and secure grip on the handle assemblies and allows the battery to be easily lifted.

Figure 1:
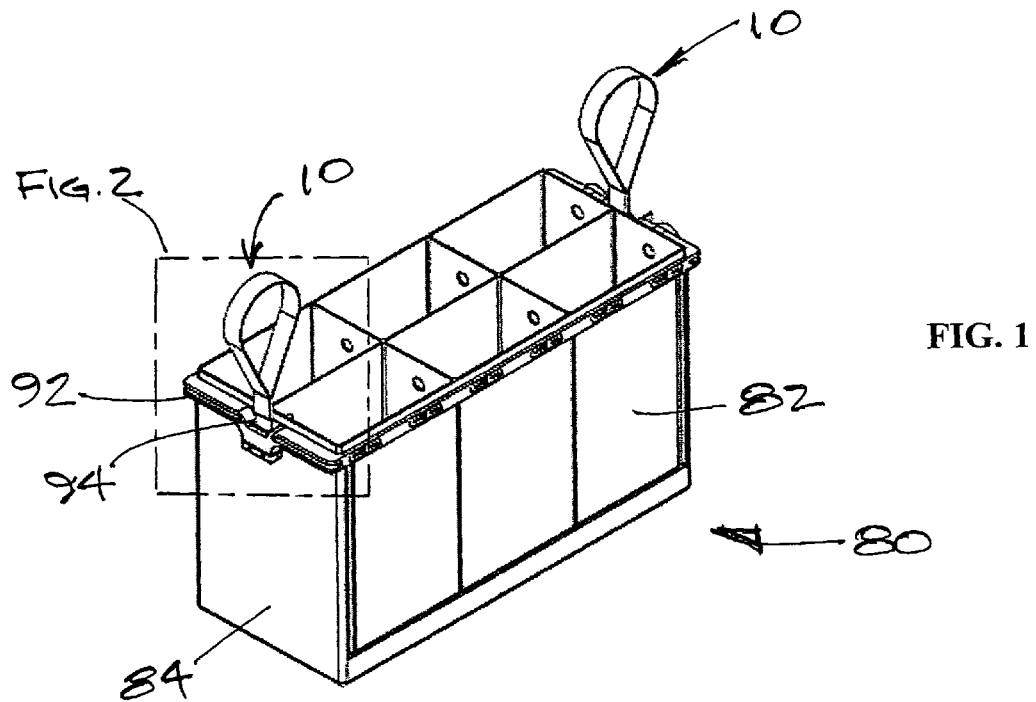
FIG. 1 is a perspective view of a battery with the cover removed and a pair of handle assemblies of the present invention detachably attached to opposing ends of the battery.

Referring now to the drawings, FIG. 1 shows a battery 80 having a pair of side walls 82 and a pair of end walls 84 with the cover removed. A pair of handle assemblies 10 according to the present invention is attached to the opposing end walls 84 of the battery 80. The handle assemblies 10 are attached, as will be described in more detail below, by passing the handle portion 14 through a slot 94 and connecting the attachment structure 8 (see FIGS. 8-11) to a protrusion 90 on the end wall 84 (see FIG. 4). A detail of a handle assembly 10 mounted in one of the slots 94 is shown in FIG. 2.

Figure 2:
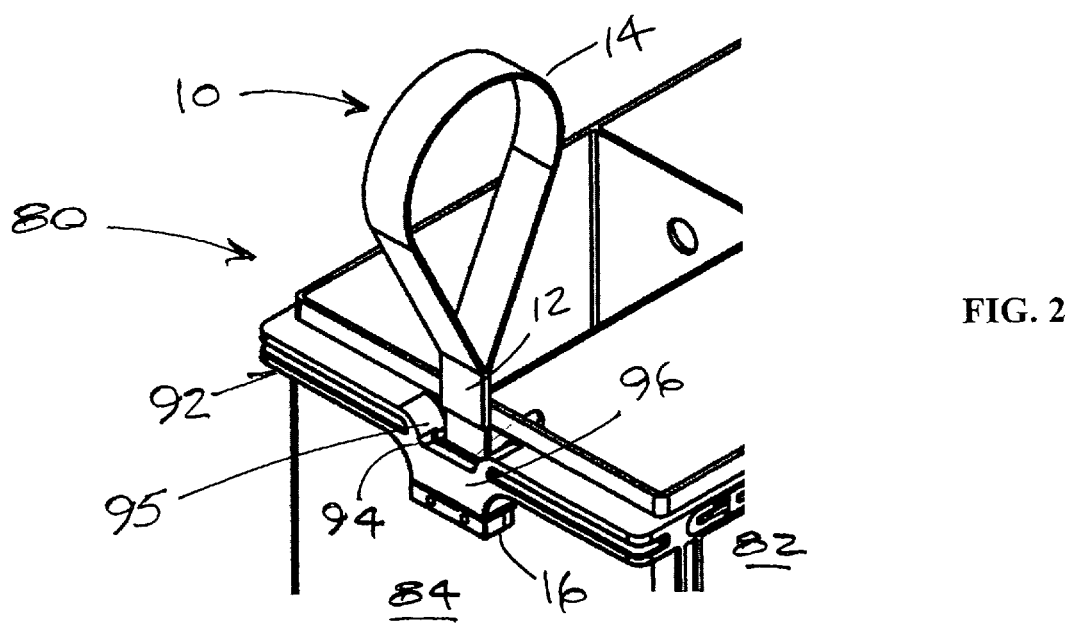
FIG. 2 is a detail of one of the handle assemblies attached to the battery in FIG. 1.

FIG. 2 shows a detail of a handle assembly 10 attached to the slot 94 in the end wall 84 of the battery 80 in FIG. 1. The battery 80 has a lip 92 extending outwardly from the end wall 84 and a slot 94 in the lip 92 bounded by the end wall 84 and a slot side wall 96 extending around the slot 94, preferably around at least three sides of the slot 94. The slot 94 is located in a recessed portion 95 of the lip 92. The handle loop 14 and strap 12 pass through the slot 94 and the protrusion 90 (see FIG. 4) is received by the channel 20 in the attachment structure 8 (see FIG. 8). The attachment structure 8 moves upwardly until the protrusion 90 reaches the closed end 26 of the channel 20. A moderate upward force applied to the handle loop 14 causes the protrusion 90 to be dislodged from the channel 20 and engaged by a cavity 36 located just below the closed end 26 of the channel 20. This secures the handle assembly 10 to the battery 80 so that it does not fall through the slot 94 when released by the user. When the protrusion 90 engages the cavity 36, the base 16 contacts the side wall 96 of the slot 94 and supports the battery 80 when lifted by the handle assembly 10.

Figure 3:
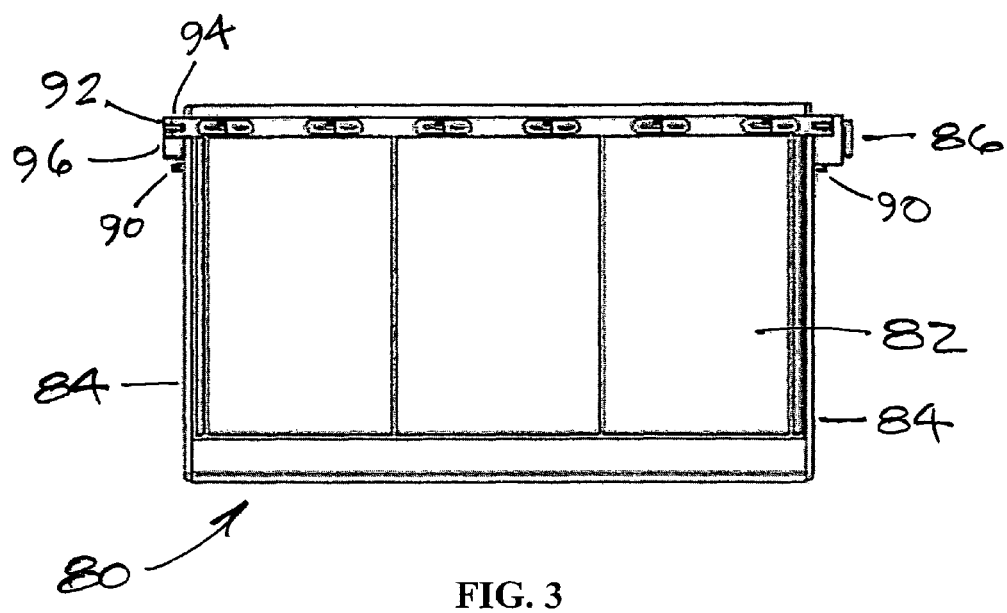
FIG. 3 is a side view of the battery shown in FIG. 1.
Figure 4:
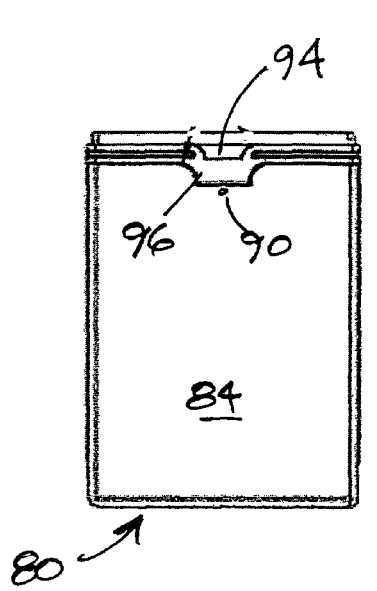
FIG. 4 is an end view of the non-terminal end of the battery shown in FIG. 1.
Figure 5:
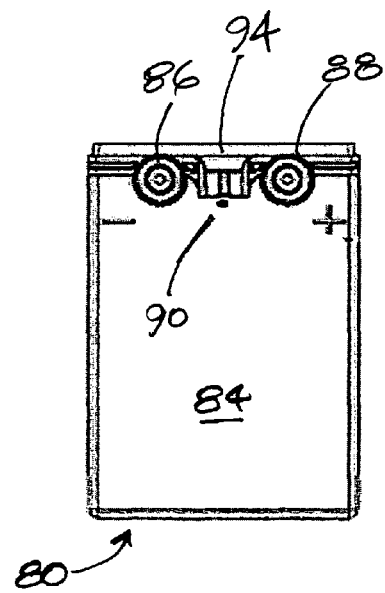
FIG. 5 is an end view of the terminal end of the battery shown in FIG. 1.

FIG. 3 shows a side view of the battery 80 in FIG. 1 with a lip 92, slot side wall 96 and protrusion 90 extending from each end wall 84 at the top of the battery 80. A battery terminal 86 extends from the end wall 84 on the right side and hides the slot 94 and slot side wall 96 on that end. FIG. 4 shows "non-terminal" end wall 84 with the protrusion 90 near the lip 92 at the top of the battery 80. FIG. 5 shows the opposite end wall 84 with two battery terminals 86, 88, and the protrusion 90 and slot 94 located between them. The handle assemblies 10 are designed to fit between the two terminals 86, 88 without interfering with the connections to them. Moreover, the handle assemblies 10 are slidably inserted into the slot 94 which allows them to be attached and detached without having to disconnect the connections to the terminals 86, 88.

Figure 6:
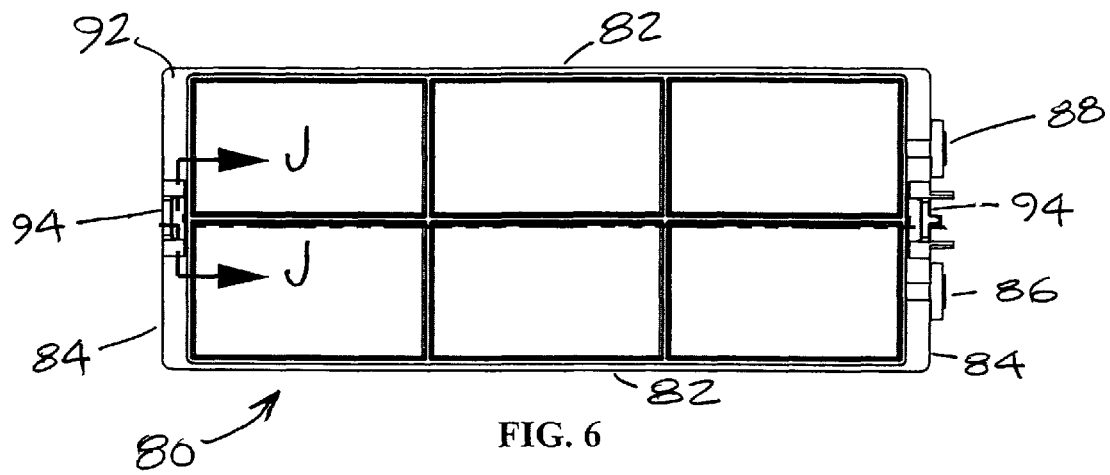
FIG. 6 is a top view of the battery shown in FIG. 1.
Figures 7, 8, 9:
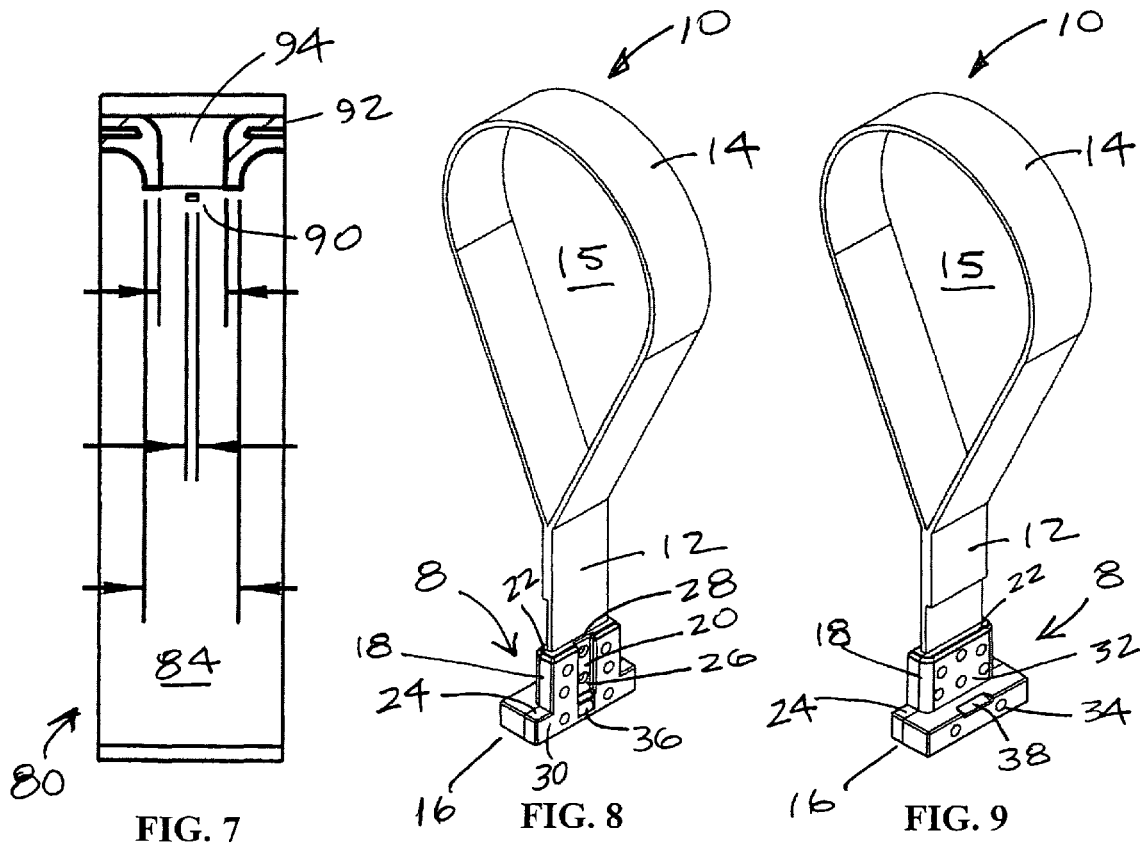
FIG. 7 is a sectional view of the center portion of the non-terminal end of the battery shown in FIG. 6.
FIG. 8 is a perspective view of the back side of an embodiment of the handle assembly of the present invention.
FIG. 9 is a perspective view of the front side of the handle assembly shown in FIG. 8.

FIG. 6 shows the top of the battery 80 and a section J-J is taken through the center of the slot 94, parallel to the side wall 84. FIG. 7 shows the sectional view J-J from FIG. 6 with the protrusion 90 located below the slot 94 in the lip 92. The slot 94 is sized to allow the handle loop 14 and strap 12 to easily pass through and then snugly engage the attachment structure 8 (see FIG. 8) of the handle assembly 10.

FIGS. 8 and 9 show the back side 30 and front side 32, respectively, of the handle assembly 10. The handle assembly 10 includes the attachment structure 8, the strap 12 and the handle loop 14. The attachment structure 8 has a base 16 and a side wall 18 extending perpendicularly from back side 30 side of the base 16. A pair of shoulders 24 is formed on the base 16 on either end of the side wall 18 at the point where the side wall 18 connects to the base 16. A channel 20 is formed on the back side 30 of the side wall 18 and extends from an open end 28 at the top edge 22 of the side wall 18 to a closed end 26 at or near the base 16. Below the closed end 26 of the side wall 18 is the cavity 36 for receiving the protrusion 90 on the side wall 84. Preferably, the attachment structure 8 is formed in a molding operation, wherein the attachment structure 8 is molded around the end of the strap 12. The other end of the strap 12 is attached to the handle loop 14 of the handle assembly 10. The strap 12 is bonded to the attachment structure 8 as a result of the molding process, which can create a plurality of holes 34 in the attachment structure 8.

The handle loop 14 is an elongated member that corrects with the strap 12 at both ends and forms a loop or opening 15. FIG. 9 also shows a notch 38 on the base 16, which can be engaged by a screw driver (not shown) to detach the attachment structure 8 from the slot 94 (FIG. 2).

FIGS. 10 and 11 show the rear and front of the handle assembly 10. FIG. 10 illustrates how the channel 20 on the rear of the side wall 18 extends from the open end 28 at the top edge 22 of the side wall 18 to the closed end 26 near the base 16. The cavity 36 is located next to the closed end 26 and is sized to receive the protrusion 90 on the end wall 84 of the battery 80. FIGS. 10 and 11 also illustrate how the shoulders 24 extend from the side wall 18. These shoulders 24 contact the bottom of the slot side wall 96 when the cavity 36 engages the protrusion 90.

Figure 12:
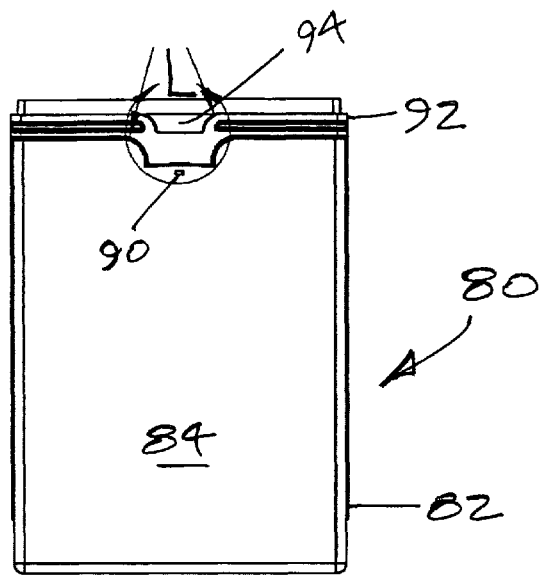
FIG. 12 is an end view of a battery opposite the terminals and shows a Detail L of the slot for the handle assembly.
Figure 13:
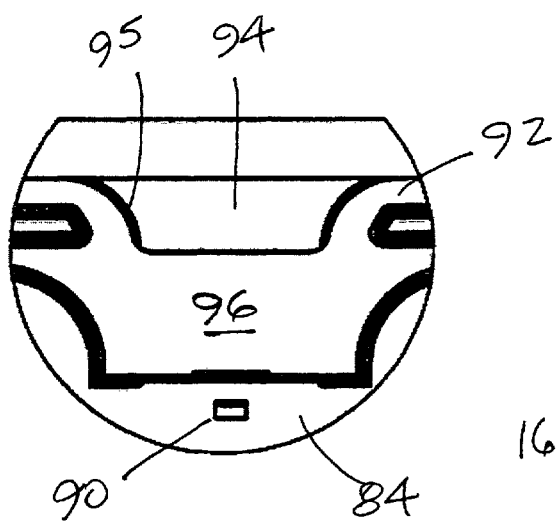
FIG. 13 is a detail view of the slot shown in FIG. 12.
Figure 14:
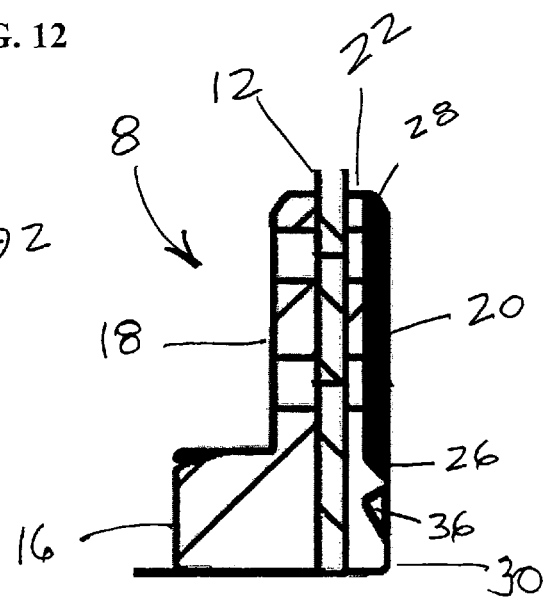
FIG. 14 is a detail side view of the attachment structure and shows the channel and cavity on the back side of the wall.

FIG. 12 shows the end 84 of the battery 80 and a Detail L of the slot 94 that receives the handle assembly 10. Detail L is shown in FIG. 13 and illustrates the location of the slot 94 in the recessed portion 95 of the edge 92. The slot 94 is formed by the end wall 84 of the battery 80 and a slot side wall 96. The protrusion 90 is located below the slot 94. FIG. 14 shows a detail of the attachment structure 8 with a channel 20 on the back 30 of the side wall 18 extending from the top edge 22 to the closed end 26. Below the closed end 26 of the channel 20 is the cavity 36 located in the base 16 that engages the protrusion 90.

Figure 15:
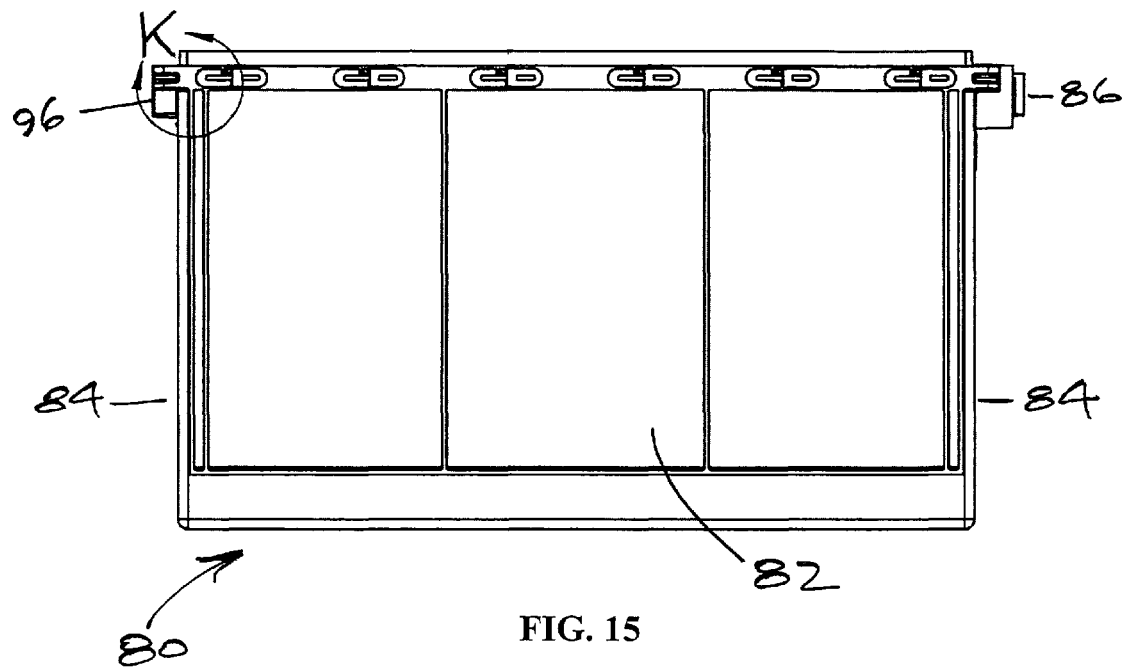
FIG. 15 is a side view of a battery and shows a Detail K of the slot for the handle assembly.
Figure 16:
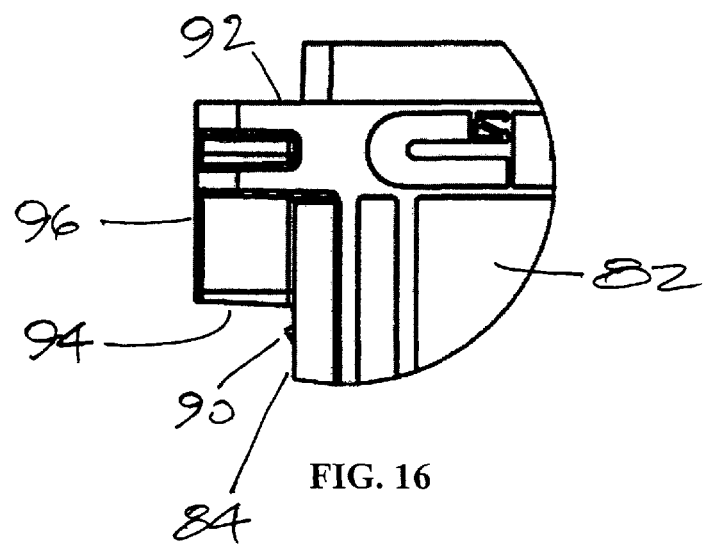
FIG. 16 is a detail side view of the slot for the handle assembly.

FIG. 15 shows the side 82 of a battery 80 and a Detail K of the slot for the handle assembly (not shown). FIG. 16 shows Detail K and how the slot side wall 96 substantially extends parallel to the end wall 84 to form the slot 90 in the lip 92. The protrusion 90 extends from the side wall 84 at a point just below the bottom of the slot 94.

Figure 17:
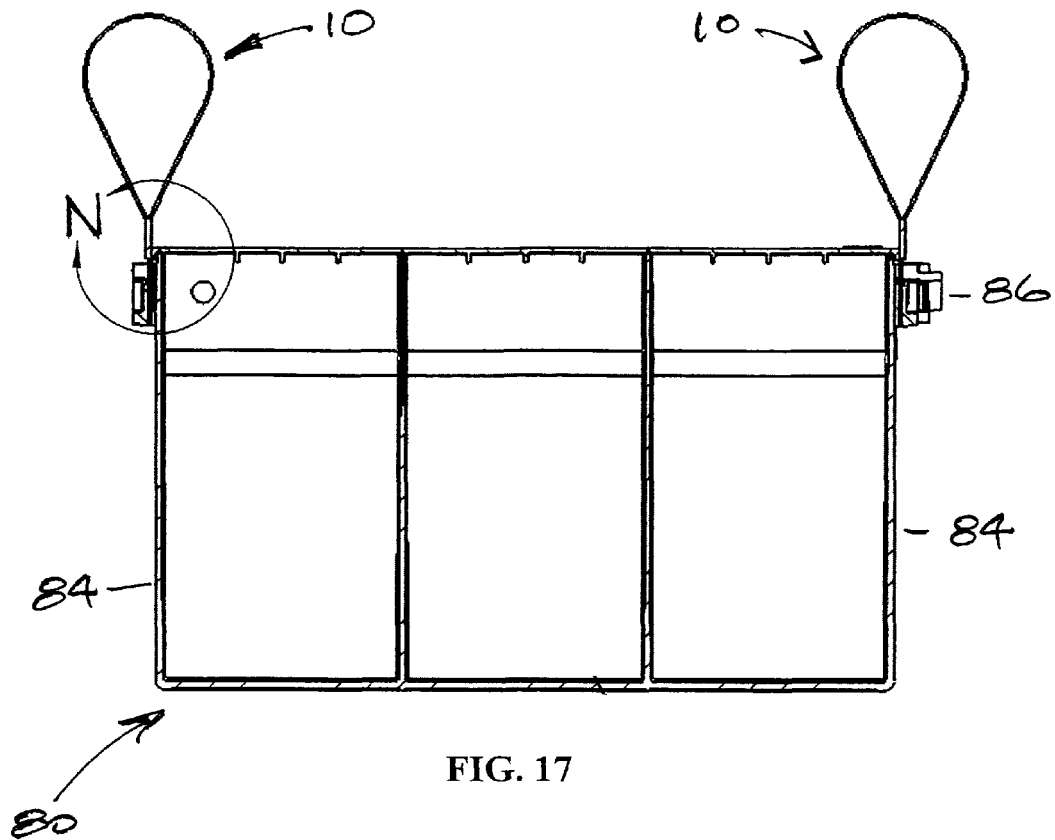
FIG. 17 is a sectional view of a battery taken through its longitudinal axis and shows a Detail K of the slot for the handle assembly.
Figure 18:
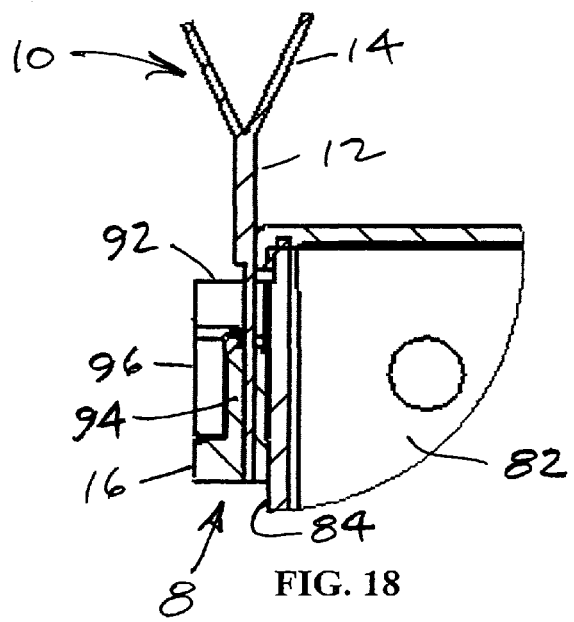
FIG. 18 is a detail side view of the slot with the handle assembly attached.

FIG. 17 is a sectional view of a battery 80 taken along the longitudinal axis so that it bisects the two handle assemblies 10. FIG. 17 shows a Detail N of the slot 94 on one end 84 of the battery 80 and the attachment structure 8 of the handle assembly 10. FIG. 18 shows Detail N and illustrates the attachment structure 8 inserted in the slot 94 and the handle assembly 10 extending out of the top of the slot 94. The base 16 of the attachment structure 8 contacts the bottom of the slot side wall 96 to support the battery 80 when it is lifted by the handle assemblies 10.

Figure 19:
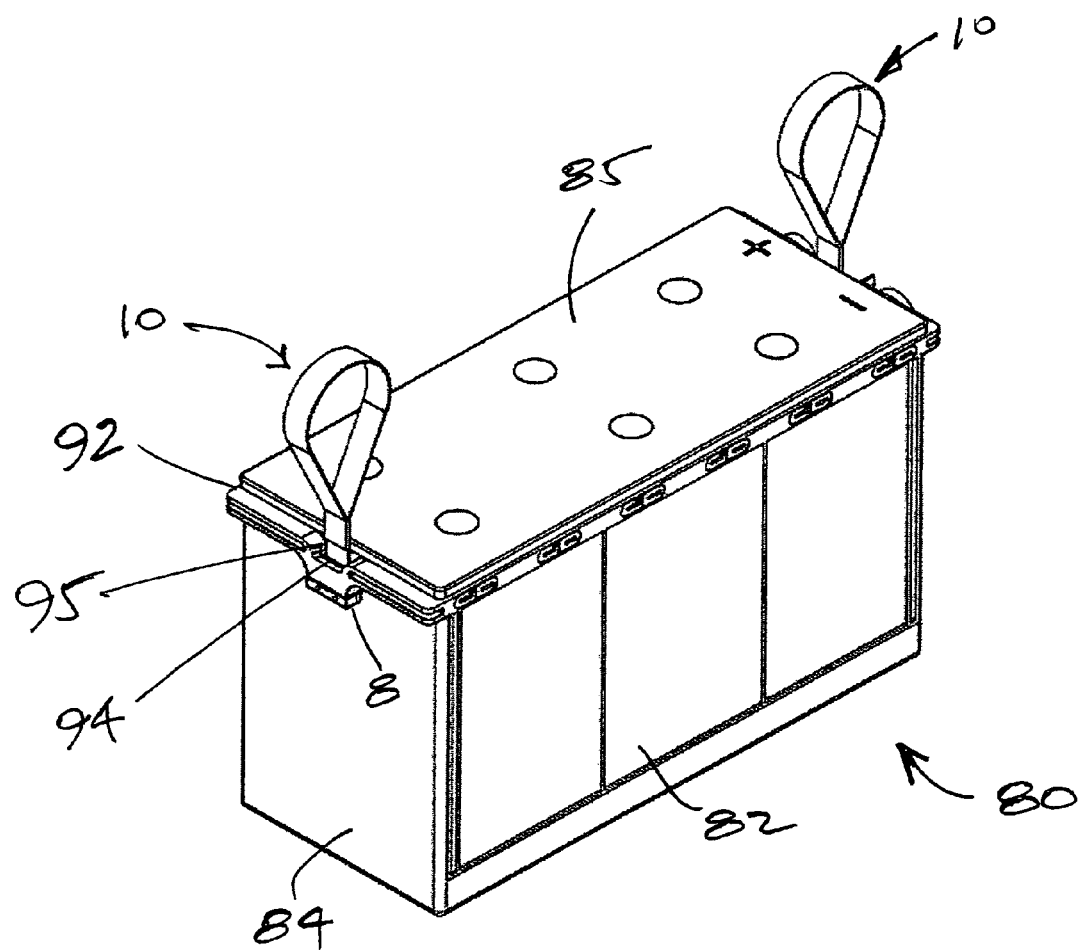
FIG. 19 is a perspective view of a battery with a cover and a pair of handle assemblies of the present invention detachably attached to opposing ends of the battery.

FIG. 19 shows a battery 80 with a cover 85 fitted over the top and a pair of handle assemblies 10 attached through the slots 94 on the opposing ends 84. This figure illustrates how the recessed portion 95 of the lip 92 provides clearance so that the handle assembly 10 can be attached and detached without interfering with the overhanging cover 85 from the battery 80. The recessed portion 95 provides sufficient clearance between the lip 92 and the cover 85 so that the handle loop 14 and strap 12 can freely pass through the slot 94. Moreover, the handle assemblies 10 can be folded out of the way so to allow full access to the cover 85.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A battery with a pair of handle assemblies comprising:
    a battery casing having a substantially rectangular bottom wall with a pair of side walls and a pair of end walls extending therefrom to form an opening, wherein the battery casing comprises:
        a pair of lips extending outwardly from the pair of end walls near the opening, wherein each lip has a centrally located slot defined by the end wall and a slot side wall; and
        a pair of protrusions on each of the end walls located below the slot; and
    a pair of handle assemblies, wherein each handle assembly comprises:
        an attachment structure comprising a substantially flat, rectangular base and a side wall having a front and back and extending from a side of the base to form a top edge, wherein the back of the side wall has a cavity and a channel extending from an open end at the top edge to a closed end proximate the cavity; and
        a handle connected to the side wall,
    wherein the handles are adapted to pass through the slots on the end walls of the battery casing, the channels are adapted to slidably contact the protrusions on the end walls, the cavities are adapted to detachably engage the protrusions and the bases are adapted to contact the slot side walls.

2. The battery with a pair of handle assemblies according to claim 1, wherein the handle comprises a strap connected to the side wall on a first end and a loop on the second end.

3. The battery with a pair of handle assemblies according to claim 2, wherein the loop is foldable.

4. The battery with a pair of handle assemblies according to claim 1, wherein each of the slots has a top and a bottom, and wherein each of the handle assemblies passes from the bottom through the top of the slots.

5. The battery with a pair of handle assemblies according to claim 1, wherein each of the slots has a top, and wherein the top of each of the slots is in a recessed portion of the lip.

6. The battery with a pair of handle assemblies according to claim 5, wherein the battery casing further comprises a cover for the opening and wherein the recessed portions of the lips provide clearance between the slots and the cover for attaching and detaching the handle assemblies.

7. The battery with a pair of handle assemblies according to claim 1, wherein each of the bases of the attachment structures has a notch for detaching the base from the slot.

8. The battery with a pair of handle assemblies according to claim 1, wherein one of the end walls has a pair of battery terminals for connecting the battery and, wherein one of the slots is located between the pair of terminals.

9. A battery with a pair of handle assemblies comprising:
    a battery casing having a substantially rectangular bottom wall with a pair of side walls and a pair of end walls extending therefrom to form an opening, wherein the battery casing comprises:
        a pair of lips extending outwardly from the pair of end walls near the opening, wherein each lip has a centrally located slot defined by the end wall and a slot side wall, and wherein each of the slots has a top and is located in a recessed portion of the lip; and
        a pair of protrusions on each of the end walls located below the slot; and
    a pair of handle assemblies, wherein each handle assembly comprises:
        an attachment structure comprising a substantially flat, rectangular base and a side wall having a front and back and extending from a side of the base to form a top edge, wherein the back of the side wall has a cavity and a channel extending from an open end at the top edge to a closed end proximate the cavity; and
        a handle connected to the side wall, wherein the handle comprises a strap connected to the side wall on a first end and a loop on the second end,
    wherein the handles are adapted to pass through the slots on the end walls of the battery casing, the channels are adapted to slidably contact the protrusions on the end walls, the cavities are adapted to detachably engage the protrusions and the bases are adapted to contact the slot side walls.

10. The battery with a pair of handle assemblies according to claim 9, wherein the side wall is molded around the strap.

11. The battery with a pair of handle assemblies according to claim 9, wherein the loop is foldable.

12. The battery with a pair of handle assemblies according to claim 9, wherein each of the slots has a bottom, and wherein each of the handle assemblies passes from the bottom through the top of the slots.

13. The battery with a pair of handle assemblies according to claim 9, wherein the battery casing further comprises a cover for the opening and wherein the recessed portions of the lip provide clearance between the slots and the cover for attaching and detaching the handle assemblies.

14. The battery with a pair of handle assemblies according to claim 9, wherein each of the bases of the attachment structures has a notch for detaching the base from the slot.

15. The battery with a pair of handle assemblies according to claim 9, wherein one of the end walls has a pair of battery terminals for connecting the battery and, wherein one of the slots is located between the pair of terminals.

16. The battery with a pair of handle assemblies according to claim 2, wherein the side wall is molded around the strap.

* * * * *